(12) United States Patent
Xu (10) Patent No.: US 11,403,487 B2
(45) Date of Patent: Aug. 2, 2022

(54) ENHANCED TRAINING METHOD AND APPARATUS FOR IMAGE RECOGNITION MODEL

(71) Applicant: ALIPAY (HANGZHOU) INFORMATION TECHNOLOGY CO., LTD., Zhejiang (CN)

(72) Inventor: Wenhao Xu, Hangzhou (CN)

(73) Assignee: Alipay (Hangzhou) Information Technology Co., Ltd., Zhejiang (CN)

(\*) Notice: Subject to any disclaimer, the term of this patent is extended or adjusted under 35 U.S.C. 154(b) by 0 days.

(21) Appl. No.: 17/362,671

(22) Filed: Jun. 29, 2021

(65) Prior Publication Data
US 2022/0101049 A1 Mar. 31, 2022

(30) Foreign Application Priority Data
Sep. 29, 2020 (CN) .......................... 202011054451.5

(51) Int. Cl.
*G06K 9/62* (2022.01)
*G06N 5/04* (2006.01)
(Continued)

(52) U.S. Cl.
CPC ......... *G06K 9/6256* (2013.01); *G06K 9/6215* (2013.01); *G06K 9/6289* (2013.01);
(Continued)

(58) Field of Classification Search
CPC .. G06K 9/6256; G06K 9/6215; G06K 9/6289; G06N 5/04; G06N 20/00; G06V 40/172; G06V 40/45
See application file for complete search history.

(56) References Cited

U.S. PATENT DOCUMENTS 7,889,242 B2 * 2/2011 Cazier .................... G06T 11/60
  348/222.1
10,719,301 B1 * 7/2020 Dasgupta ............ G06F 11/3688
(Continued)

FOREIGN PATENT DOCUMENTS

CN 102708541 A 10/2012
CN 106485192 A 3/2017
(Continued)

OTHER PUBLICATIONS

Extended European Search Report in European Application No. 21182681.3, dated Dec. 15, 2021, 12 pages.
(Continued)

*Primary Examiner* — John W Lee
(74) *Attorney, Agent, or Firm* — Fish & Richardson P.C.

(57) ABSTRACT

Implementations of the present specification provide an enhanced training method for an image recognition model. A predetermined quantity or predetermined proportion of samples are randomly selected from a first sample set as a seed sample for extension to obtain several extended samples. The extended sample is obtained by adding disturbance to an original image without changing an annotation result. In a sample extension process, disturbance values are arranged towards neighborhood in predetermined distribution with a reference pixel as a reference, so that real disturbance can be well simulated. Because the annotation result of the extended sample remains unchanged after the disturbance is added, an image recognition model trained by using the extended sample can well recognize a target recognition result of an original image, thereby improving robustness of the image recognition model.

20 Claims, 6 Drawing Sheets

(51) Int. Cl.
   *G06N 20/00* (2019.01)
   *G06V 40/16* (2022.01)
   *G06V 40/40* (2022.01)

(52) U.S. Cl.
   CPC .............. *G06N 5/04* (2013.01); *G06N 20/00* (2019.01); *G06V 40/172* (2022.01); *G06V 40/45* (2022.01)

(56) References Cited

U.S. PATENT DOCUMENTS

| | | | | |
|---|---|---|---|---|
| 11,274,929 | B1* | 3/2022 | Afrouzi | G05D 1/0274 |
| 2012/0257821 | A1* | 10/2012 | Saito | G06T 3/4015 |
| | | | | 382/162 |
| 2015/0093041 | A1* | 4/2015 | Kang | G06T 5/002 |
| | | | | 382/275 |
| 2016/0267695 | A1 | 9/2016 | Opdenbosch | |

FOREIGN PATENT DOCUMENTS

| | | |
|---|---|---|
| CN | 108108677 | 6/2018 |
| CN | 108256473 A | 7/2018 |
| CN | 109272031 A | 1/2019 |
| CN | 109903242 | 6/2019 |
| CN | 110796206 A | 2/2020 |
| CN | 111260653 | 6/2020 |
| CN | 111402124 A | 7/2020 |

OTHER PUBLICATIONS

Modas et al., "SparseFool: A Few Pixels Make a Big Difference," 2019 IEEE/CVF Conference on Computer Vision and Pattern Recognition (CVPR), Jun. 15, 2019, pp. 9079-9088.

Narodytska et al., "Simple Black-Box Adversarial Perturbations for Deep Networks," Cornell University Library, arXiv:1612.06299v1, Dec. 19, 2016, pp. 1-19.

Papernot et al., "The Limitations of Deep Learning in Adversarial Settings," 2016 IEEE European Symposium on Security and Privacy, Mar. 2016, pp. 372-387.

Shu et al., "Adversarial Image Generation and Training for Deep Neural Networks," Cornell University Library, arXiv:2006.03243v2, Sep. 7, 2020, 9 pages.

Su et al., "One Pixel Attack for Fooling Deep Neural Networks," Cornell University Library, arXiv::1710.08864v7, Oct. 2017, pp. 1-15.

Wang et al., "A Survey on face data augmentation for the training of deep neural networks," Neural Computing and Applications, Mar. 17, 2020, 32(19):15503-15531.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

\* cited by examiner

ENHANCED TRAINING METHOD AND APPARATUS FOR IMAGE RECOGNITION MODEL

CROSS-REFERENCE TO RELATED APPLICATIONS

This application claims priority to Chinese Patent Application No. 202011054451.5, filed on Sep. 29, 2020, which is hereby incorporated by reference in its entirety.

TECHNICAL FIELD

One or more embodiments of the present specification relate to the field of computer technologies, and in particular, to image disturbance processing, image sample extension, and enhanced training methods and apparatuses for an image recognition model by using an extended sample.

BACKGROUND

Image recognition is a technology using a computer to process, analyze, and understand images to recognize different modes of targets and objects. Image recognition is widely used in a variety of fields, such self-driving, take work attendance, payment authentication, criminal investigation and tracing. In some service scenarios, in addition to target detection, it is further required to recognize whether a related target is a real target entity. For example, in a face recognition payment authentication scenario, considering security of a user's funds, it is further required to determine whether a face image is an image of a living feature to avoid using a face photo to impersonate a real person to perform payment.

In this case, if an image recognition model is trained by using only a standard training sample, accuracy of an image recognition result can be reduced when image interference increases, which may cause problems. For example, fund security in a face recognition payment authentication service scenario cannot be ensured. Therefore, how to improve robustness of the image recognition model is of crucial important.

SUMMARY

One or more embodiments of the present specification describe image disturbance and disturbance sample generation, and enhanced training methods and apparatuses for an image recognition model by using a generated disturbance sample, to resolve one or more problems mentioned in the background.

According to a first aspect, an enhanced training method for an image recognition model is provided, including: randomly selecting a predetermined quantity or predetermined proportion of samples from a first sample set as seed samples, where each seed sample corresponds to each seed image and an annotation result for the corresponding seed image; obtaining, for each seed sample, several extended samples obtained based on an extension operation, where the extension operation for a single seed sample includes: separately merging, on at least one image channel, pixels of a single seed image corresponding to the single seed sample with disturbance values arranged in predetermined distribution based on a reference pixel as a center, to obtain a single disturbance image, where the predetermined distribution is related to a distance from each pixel to the reference pixel; and constructing a single extended sample based on the single disturbance image and the annotation result corresponding to the single seed sample, where the reference pixel is determined based on a predetermined rule; and performing enhanced training in the image recognition model based on the extended sample.

According to an embodiment, the separately merging, on at least one image channel, pixels of a single seed image corresponding to the single seed sample with disturbance values arranged in predetermined distribution with a reference pixel as a center, to obtain a single disturbance image includes: constructing a mask image with pixel arrangement the same as the single seed image; determining, in the mask image, a reference point corresponding to a predetermined reference disturbance value and corresponding to the reference pixel based on a predetermined rule; generating, in the mask image, disturbance values sequentially decrease or sequentially increase from the reference disturbance value towards surrounding pixels based on the predetermined distribution with the reference point as a center, to obtain a first noise image; and obtaining a first disturbance image based on a result of merging the first noise image with a first image channel of the single seed image.

According to an embodiment, the predetermined distribution is linear distribution or normal distribution.

According to an embodiment, a result of superposing the first noise image onto the first image channel of the single seed image includes a result obtained by performing weighted average on disturbance values in the first noise image and image values on the first image channel in a one-to-one pixel mapping relationship.

According to an embodiment, the first disturbance image further includes: a result of superposing the first noise image onto a second image channel of the single seed image; or a result of superposing another noise image onto the second image channel of the single seed image.

According to an embodiment, the single seed image includes a first pixel, and a distance between the first pixel and the reference pixel is a Euclidean distance between the first pixel and the reference pixel by using rows and columns that the first pixel and the reference pixel are located as coordinates.

According to an embodiment, the separately merging, on at least one image channel, pixels of a single seed image corresponding to the single seed sample with disturbance values arranged in predetermined distribution based on a distance from the reference pixel with a reference pixel as a center, to obtain a single disturbance image includes: constructing an auxiliary matrix with pixel arrangement the same as the single seed image; determining, based on a predetermined rule, a reference element that is in the auxiliary matrix and corresponds to a predetermined reference disturbance value, where the reference element is a matrix element corresponding to the reference pixel; generating, in the auxiliary matrix as corresponding element values, disturbance values sequentially decrease or sequentially increase from the reference disturbance value towards surrounding elements based on the predetermined distribution with the reference element as a center, to obtain a first noise matrix; and obtaining a first disturbance image based on a result of superposing the first noise matrix onto a first image channel of the single seed image.

According to an embodiment, the performing enhanced training in the image recognition model based on the extended sample includes: adding each extended sample to the first sample set, and training the image recognition model by using the first sample set; or adding each extended sample to a second sample set, and performing, by using the second sample set, enhanced training on an image recognition model obtained through training by using the first sample set.

According to a second aspect, an image processing method is provided, including: constructing a mask image with pixel arrangement the same as a to-be-processed image; determining, in the mask image, a reference pixel corresponding to a predetermined reference disturbance value based on a predetermined rule; generating, in the mask image, disturbance values sequentially decrease or sequentially increase from the reference disturbance value towards surrounding pixels based on predetermined distribution with the reference pixel as a center, to obtain a noise image; and forming a disturbance image for the to-be-processed image based on a result of merging the noise image with a first image channel of the to-be-processed image.

According to an embodiment, the predetermined distribution is linear distribution or normal distribution.

According to an implementation, a result of superposing the noise image onto the first image channel of the to-be-processed image includes a result obtained by performing weighted average on disturbance values in the noise image and image values on the first image channel in a one-to-one pixel mapping relationship.

According to an embodiment, the first disturbance image further includes: a result of superposing the first noise image onto a second image channel of the single seed image; or a result of superposing another noise image onto the second image channel of the single seed image.

According to an embodiment, a predetermined maximum value or minimum value exists in the disturbance values and corresponds to a pixel with a maximum distance from the reference pixel.

According to a third aspect, an image extension method is provided, including: obtaining a first sample to be extended, where the first sample corresponds to a first image and a first annotation result for the first image; separately merging, on at least one image channel, pixels of the first image with disturbance values arranged in predetermined distribution with a reference pixel as a center, to obtain a first disturbance image, where the predetermined distribution is related to a distance from each pixel to the reference pixel; and combining the first disturbance image with the first annotation result to obtain a first extended sample.

According to an embodiment, the separately merging, on at least one image channel, pixels of the first image with disturbance values arranged in predetermined distribution with a reference pixel as a center, to obtain a first disturbance image includes: constructing a mask image with pixel arrangement the same as the first image; determining, in the mask image, a reference point corresponding to a predetermined reference disturbance value based on a predetermined rule, where the reference point is a pixel corresponding to the reference pixel; generating, in the mask image, disturbance values sequentially decrease or sequentially increase from the reference disturbance value towards surrounding pixels based on the predetermined distribution with the reference point as a center, to obtain a first noise image; and forming a first disturbance image for the first image based on a result of merging the first noise image with a first image channel of the first image.

According to an embodiment, a predetermined maximum value or minimum value exists in the disturbance values and corresponds to a pixel with a maximum distance from the reference pixel.

According to an embodiment, the generating, in the mask image, disturbance values sequentially decrease or sequentially increase from the reference disturbance value towards surrounding pixels based on the predetermined distribution with the reference point as a center, to obtain a first noise image further includes: generating, in the mask image, the disturbance values sequentially decrease or sequentially increase from the reference disturbance value towards the surrounding pixels based on the predetermined distribution with the reference point as a center; and performing the following correction processing on each disturbance value: for a single pixel, modifying a corresponding disturbance value to a median value of disturbance values separately corresponding to pixels in a predetermined neighborhood of the pixel; and using a mask image correspondingly having each corrected disturbance value as the first noise image.

According to a fourth aspect, an enhanced training apparatus for an image recognition model is provided, including: a selection unit, configured to randomly select a predetermined quantity or predetermined proportion of samples from a first sample set as seed samples, where each seed sample corresponds to each seed image and an annotation result for the corresponding seed image; an obtaining unit, configured to obtain, for each seed sample, several extended samples obtained based on an extension operation, where the extension operation for a single seed sample includes: separately merging, on at least one image channel, pixels of a single seed image corresponding to the single seed sample with disturbance values arranged in predetermined distribution with a reference pixel as a center, to obtain a single disturbance image, where the predetermined distribution is related to a distance from each pixel to the reference pixel, and constructing a single extended sample based on the single disturbance image and the annotation result corresponding to the single seed sample, where the reference pixel is determined based on a predetermined rule; and a training unit, configured to perform enhanced training in the image recognition model based on the extended sample.

According to a fifth aspect, an image processing apparatus is provided, including: an image construction unit, configured to construct a mask image with pixel arrangement the same as a to-be-processed image; a reference determining unit, configured to determine, in the mask image, a reference pixel corresponding to a predetermined reference disturbance value based on a predetermined rule; a disturbance value generation unit, configured to generate, in the mask image, disturbance values sequentially decrease or sequentially increase from the reference disturbance value towards surrounding pixels based on predetermined distribution with the reference pixel as a center, to obtain a noise image; and an image merging unit, configured to form a disturbance image for the to-be-processed image based on a result of merging the noise image with a first image channel of the to-be-processed image.

According to a sixth aspect, an image extension apparatus is provided, including: a sample acquisition unit, configured to obtain a first sample to be extended, where the first sample corresponds to a first image and a first annotation result for the first image; an image disturbance unit, configured to separately merge, on at least one image channel, pixels of the first image with disturbance values arranged in predetermined distribution with a reference pixel as a center, to obtain a first disturbance image, where the predetermined distribution is related to a distance from each pixel to the reference pixel; and a sample extension unit, configured to combine the first disturbance image with the first annotation result to obtain a first extended sample.

According to a seventh aspect, a computer readable storage medium is provided, and the computer readable storage medium stores a computer program is provided. When the computer program is executed in a computer, the computer is enabled to execute the method in the first aspect, the second aspect, or the third aspect.

According to an eighth aspect, a computing device is provided, including a memory and a processor. The memory stores executable code, and when executing the executable code, the processor implements the method in the first aspect, the second aspect, or the third aspect.

According to the method and apparatus provided in the embodiments of the present invention, based on an image recognition function trained by using an original sample set, the image recognition model is further trained by using the extended sample that disturbance is added. Because the annotation result of the original sample is reserved in the extended sample, the trained image recognition model has a better recognition function for an image that disturbance is added, thereby improving robustness of the image recognition model.

BRIEF DESCRIPTION OF DRAWINGS

To describe the technical solutions in the implementations of the present disclosure more clearly, the following briefly introduces the accompanying drawings needed for describing the implementations. Clearly, the accompanying drawings in the following description show merely some implementations of the present disclosure, and a person of ordinary skill in the art can still derive other drawings from these accompanying drawings without creative efforts.

DESCRIPTION OF EMBODIMENTS

The following describes solutions of the present specification with reference to accompanying drawings.

Figure 1:
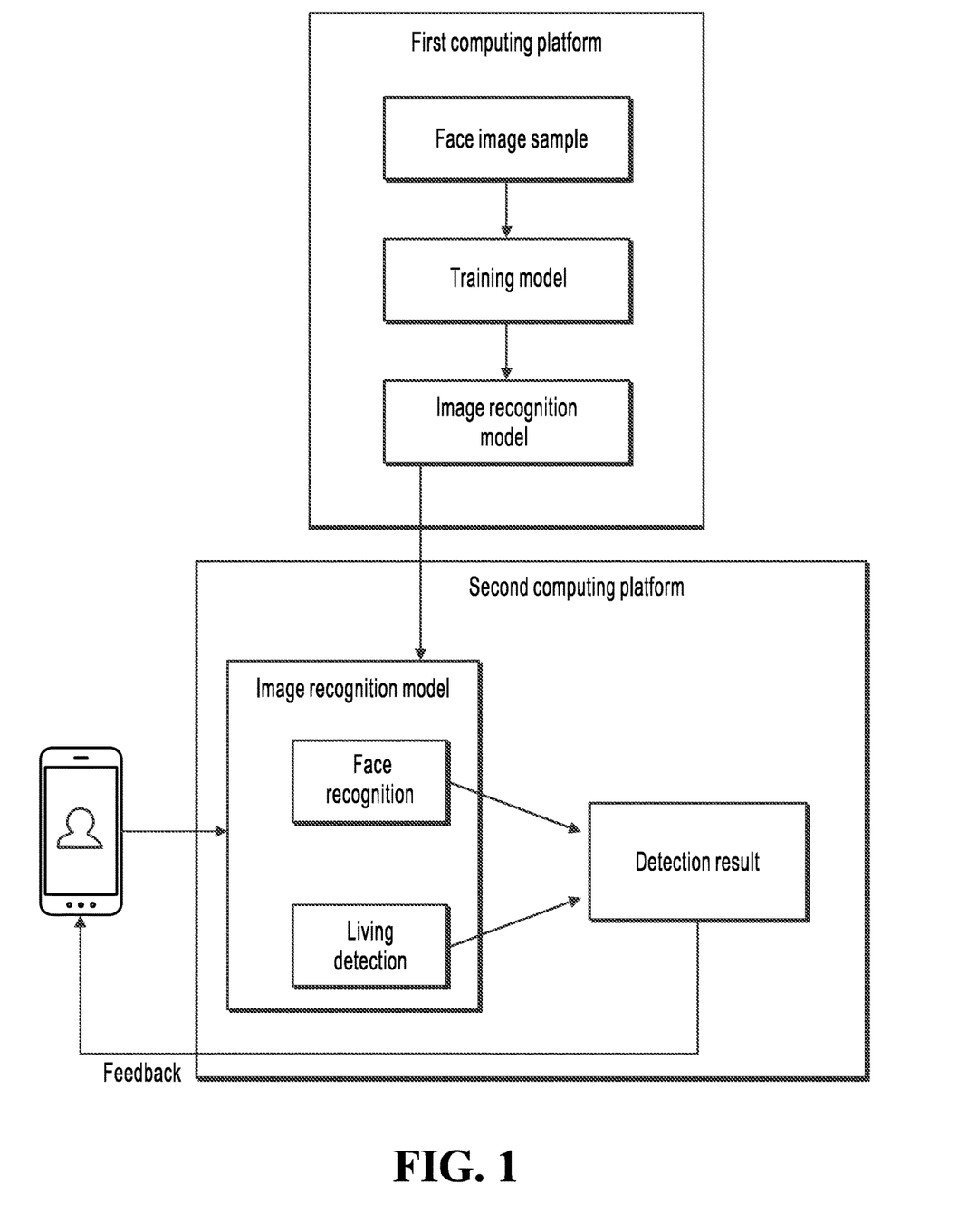
FIG. 1 is a schematic architectural diagram illustrating a specific implementation of the technical concept of the present specification.

Descriptions are first made with reference to a specific implementation scenario shown in FIG. 1. FIG. 1 is a specific implementation scenario of face recognition. In the implementation scenario, an image recognition model is first trained by using a first computing platform. The first computing platform can use a large quantity of face images as training samples to train the image recognition model. The face image sample can correspondingly have at least one of a face contour annotation result, an annotation result indicating whether the face image is an image of a living feature, and so on, and is used to guide an output result of the image recognition model. For example, the image recognition model can be implemented by using a convolutional neural network (CNN). A process of training the image recognition model can be performed in any suitable conventional method (for example, a gradient descent method is used to adjust a model parameter). Details are omitted here for simplicity.

The image recognition model trained by using the first computing platform can be used by a second computing platform for face recognition application. The first computing platform and the second computing platform can be installed on the same device or device cluster, or can be installed on different devices or device clusters. For example, the first computing platform can be installed on a server that provides support for a face recognition service, another device different from the server, or even a third-party platform delegated by a serving party. The second computing platform can be installed on a server that provides support for the face recognition service, or can be installed on a face recognition client device. The face recognition service can belong to another client device, such as a payment client device. In this case, the second computing platform can be a payment client platform.

After the image recognition model is trained by using the first computing platform, the image recognition model can be deployed on the second computing platform. On a face recognition page, the client device collects a related image and transfers the related image to the second computing platform. The second computing platform performs face recognition and living detection on the related image by using the trained image recognition model, and obtains a detection result. Then the second computing platform can feed back the detection result to the client device.

Generally, in a payment authentication scenario, the detection result is qualified only when the related image is recognized as a predetermined face through face recognition and is detected as a living person (a real person). If a photo is used to complete image collection in place of a real person, the collected image is incapable of passing living detection. However, in practice, some users (for example, criminals who illegally steal property of another person) interfere with a false image to pass the detection, affecting accuracy of an image recognition result, and increasing a probability that a false image passes the detection. For example, another person's photo is used for face image collection after being interfered with in a method of adjusting light, enhancing brightness, changing a channel value on an image channel, and so on. For an image recognition model trained by using only normal images, accuracy of recognizing these interfering images may be reduced.

To improve robustness of an image recognition model, the present specification proposes a technical concept of performing enhanced training on an image recognition model. In this technical concept, disturbance can be added to an existing training sample. A disturbance image is constructed by extending a sample image, and an extended sample is constructed by using an annotation result of the corresponding sample image. As such, an image recognition model is enhanced, so that an image of a living feature in a face image is still recognized as an image of a living feature when interference is added, and a an image of a non-living feature is still recognized as an image of a non-living feature after interference is added, thereby improving robustness of the image recognition model.

The following describes the technical concept of the present specification in detail.

Figure 2:
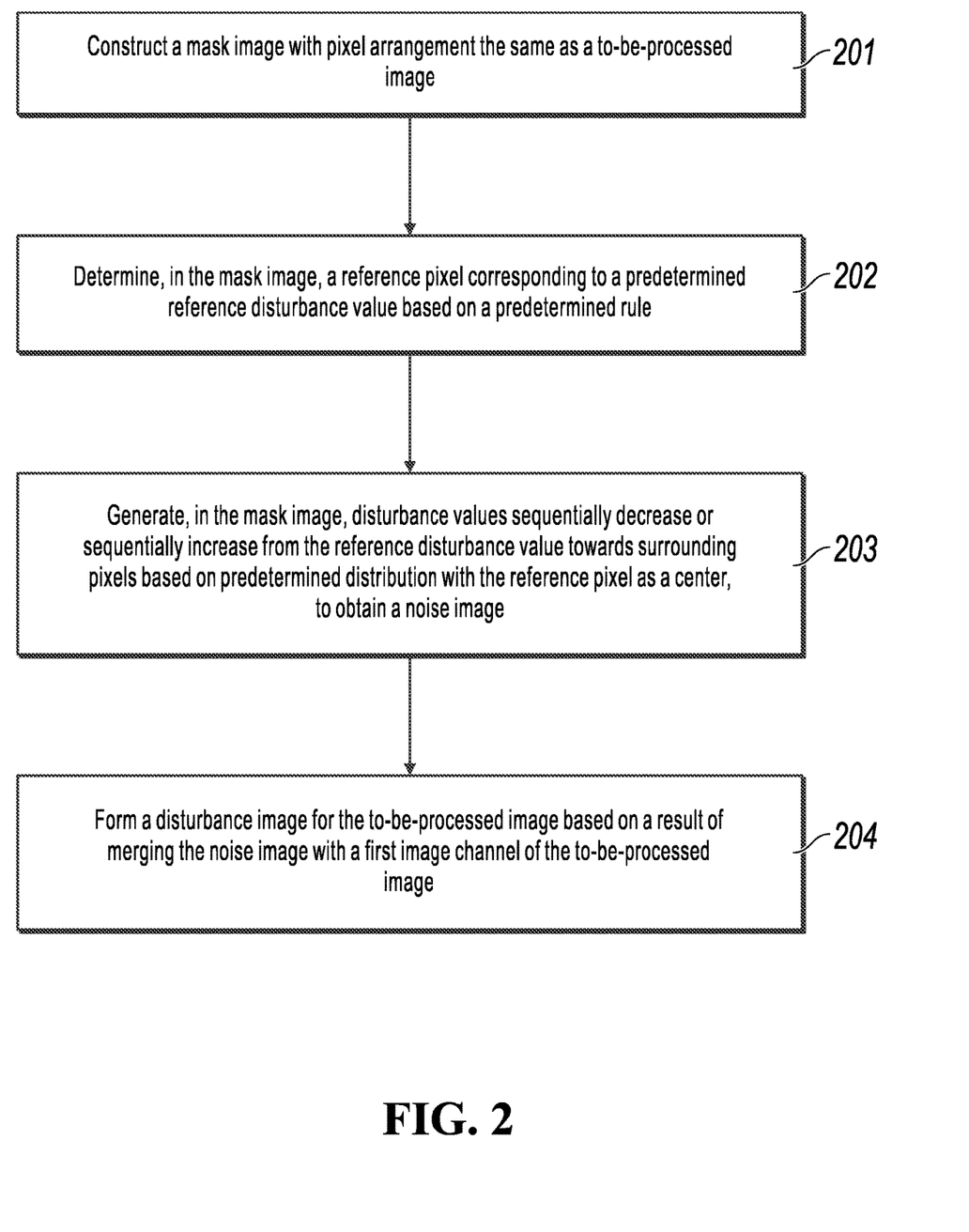
FIG. 2 is a flowchart illustrating an image processing method, according to an embodiment.

A process of adding disturbance to an image is first described by using FIG. 2. FIG. 2 is a schematic diagram illustrating an image processing process, according to an implementation of the present specification. The process can be executed by any computer, device, server, etc. that has a computing capability, for example, the first computing platform shown in FIG. 1 or another computing platform other than the first computing platform and the second computing platform.

As shown in FIG. 2, the image processing process can include the following steps. In step 201, a mask image with pixel arrangement the same as a to-be-processed image is constructed. In step 202, a reference pixel corresponding to a predetermined reference disturbance value is determined in the mask image based on a predetermined rule. In step 203, disturbance values sequentially decrease or sequentially increase from the reference disturbance value towards surrounding pixels are generated in the mask image based on predetermined distribution with the reference pixel as a center, to obtain a noise image. In step 204, a disturbance image for the to-be-processed image is formed based on a result of merging the noise image with a first image channel of the to-be-processed image.

First, the mask image with pixel arrangement the same as the to-be-processed image is constructed in step 201. It can be understood that the pixel arrangement consistency described here means that a quantity of pixels, a quantity of rows, and a quantity of columns all are consistent with those of the to-be-processed image, for example, 960×960. The to-be-processed image can be any image.

The mask image, also referred to as a mask, can be a selected image, graph, or object, and can be used to block (completely or partially) the to-be-processed image to control an image processing area or process. Here, the mask image is used to represent a graph that can be superimposed over an original image to produce interference. Actually, the mask image here is merely a figure description, and can be an image or an array. When the mask image is an image, the mask image can include pixels consistent with those of the to-be-processed image, for example, 960×960 pixels. When the mask image is an array, the mask image can include 960×960 elements. Initially, each element in the mask image can have a predetermined value (such as 0) or a random value.

It can be understood that, in one aspect, the mask image can be generated for the to-be-processed image, or can be generated for a type of image with pixel arrangement consistent with that of the to-be-processed image. In another aspect, one or more mask images can be generated for the to-be-processed image or a type of image corresponding to the to-be-processed image.

Then in step 202, the reference pixel corresponding to the predetermined reference disturbance value is determined in the mask image based on the predetermined rule. The reference disturbance value can be a reference value of the disturbance, for example, can be a maximum disturbance value or a minimum disturbance value. The reference disturbance value can be a predetermined fixed value (such as 100), or can be a value randomly generated in a reasonable range.

The predetermined rule here can be a rule for determining a reference point (corresponding to the reference pixel) in the mask image. In an embodiment, the reference point in the mask image can be a pixel or an element in an array that is randomly specified. In another embodiment, a plurality of mask images are generated for the first image, and there is a predetermined arrangement rule between reference pixels of the plurality of mask images, for example, sequentially connected, sequentially spaced by n pixels, arranged from top to bottom, arranged from left to right, arranged from top to bottom, staggered by one pixel between adjacent rows, and so on. In this case, for the current mask image, the predetermined rule is a predetermined relationship obtained based on a predetermined arrangement rule between the current mask image and a previous mask image.

As such, at least one reference point (reference pixel) can be determined in the mask image, and the reference disturbance value is determined as a disturbance value corresponding to the pixel.

Next, in step 203, the disturbance values sequentially decrease or sequentially increase from the reference disturbance value towards the surrounding pixels are generated in the mask image based on the predetermined distribution with the reference pixel as a center, to obtain the noise image.

Generally, the reference point (corresponding to the reference pixel) can be considered as a point corresponding to an interference source. For example, the interference source can be an incident point of sun light, an electric light location point, an obstruction, etc. According to a characteristic of energy transmission, interference effect of the interference source is usually sequentially weakened with the interference source as a center. In other words, the interference effect can be attenuated towards neighborhood with the reference pixel as a center. In a decay process of the interference effect, some values in the image can gradually decrease or increase. For example, brightness can be gradually lowered due to interference of an object interfering with a light source and a gradually decreased distance from the interference source, and brightness can be gradually higher due to a gradually decreased distance from the interference source after the light source is interfered with by an object for blocking. Therefore, when the reference pixel is used as a center for extension towards neighborhood, the disturbance values of the pixels can sequentially decrease or increase based on the predetermined distribution.

It can be understood that the predetermined distribution can be used to describe value distribution of disturbance values in a direction, such as linear distribution or Gaussian distribution. The distribution can be distribution of the disturbance values of the pixels in a direction with the reference point as start point, can be overall distribution (for example, overall linear distribution) of the disturbance values of the pixels in a direction passing through the reference point, or can be distribution formed based on a corresponding distance between the pixel and the reference point. An example that a 5×5 mask image is used, a pixel in the second column and the third row is used as the reference pixel, and linear distribution and Gaussian distribution are used is used below for specific description.

In an optional implementation, the reference pixel and disturbance values of other pixels around the reference pixel can be in linear distribution. For example, with the reference pixel as a vertex, disturbance values of pixels in a certain direction can be regressed to a line segment. Assume that the reference disturbance value is 20, a 5×5 noise image can be represented as the following array:

$$\begin{pmatrix} 9 & 10 & 9 & 9 & 3 \\ 12 & 15 & 12 & 9 & 4 \\ 15 & 20 & 15 & 10 & 5 \\ 12 & 15 & 12 & 9 & 4 \\ 9 & 10 & 9 & 9 & 3 \end{pmatrix}$$

In the array, the element in the third row and the second column is 20, the disturbance value 12 in the third row and the first line on the left of the element is linearly decreased, and disturbance values in the third row and the third line, the fourth line, and the fifth line on the right of the element are linearly decreased.

It can be understood that the array is merely used as an example of linear distribution in rows, columns, and slashes. In another implementation, to be closer to real disturbance, the disturbance value can be determined not based on inherent arrangement of rows, columns, etc., and instead, corresponding disturbance values are in linear distribution based on distances between the reference pixel and the pixels. For example, assume that a pixel whose distance from the reference pixel is r corresponds a disturbance value sr+b, where b is the reference disturbance value, such as 20, s is a linear coefficient, and s is a negative value when the disturbance value is decreased, s is a positive value when the disturbance value is increased, and r can be determined by using row and column coordinates of two pixels. For example, a distance between a pixel in the third row and the fifth column and an element in the third row and the second column is $\sqrt{(3-3)^2+(5-2)^2}$.

Figure 3:
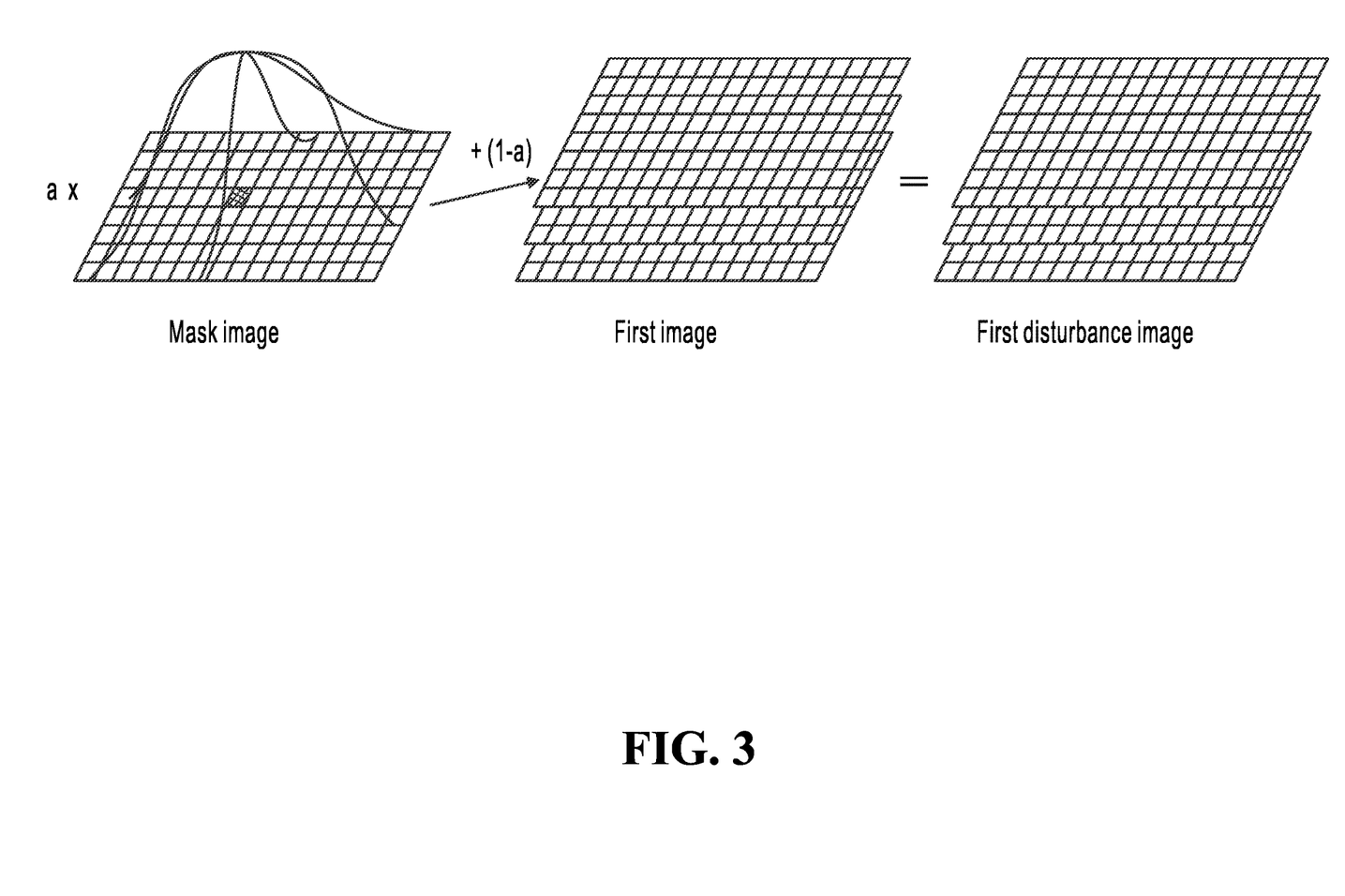
FIG. 3 is a schematic diagram illustrating an image processing principle, according to a specific example.

According to another implementation, the disturbance values of the pixels can be in normal distribution with the reference pixel as a center, as show in FIG. 3. In the normal distribution, the reference pixel can be used as a center of symmetry, the reference disturbance value is considered as a maximum/minimum value point or an average value point of normal distribution, the distances between the pixels and the reference pixel are used as variables, and an average value of the distances is 0. For example, an expression of the normal distribution is:

$$f(x) = \frac{1}{\sqrt{2\pi}\,\sigma} e^{-\frac{(x-\mu)^2}{2\sigma^2}}$$

In the expression, x–μ is a distance between a current pixel and the reference pixel, and a distance calculation method is, for example, a Euclidean distance. It can be understood that for the reference pixel, x–μ is 0, and a value off (x) is a maximum disturbance value. Based on this, a variance σ can also be obtained through calculation. In an optional implementation, the variance σ can be, for example, a predetermined value, such as 1. In this case, the maximum disturbance value or the average value point can be determined based on the variance σ.

In the embodiment shown in FIG. 2, it can be considered that disturbance values corresponding to pixels in a single direction are in the normal distribution. In another embodiment, only the distance between each pixel and the reference pixel needs to be considered, and a line in a direction passing through the reference pixel does not need to be considered. In other words, disturbance values of all pixels in the mask image generally satisfy the normal distribution with the reference pixel as a center. Details are omitted here for simplicity.

It is worthwhile to note that in the previous disturbance value determining process, a decimal with a number of decimal places can appear. To better satisfy an actual value or reduce a calculation amount, the disturbance value can be truncated in a possible design. For example, when a reasonable candidate value of the disturbance value is an integer, the following processing can be performed on a decimal: rounding up, rounding down, rounding off, and so on. When a candidate value on the image channel can be a decimal (for example, between 0 and 1), the following processing can be performed on the decimal to reserve a predetermined number of digits (for example, two significant digits): rounding up a digit after the predetermined number of digits to 1 when the digit is non-zero, cutting a digit after the predetermined number of digits when the digit is zero, rounding off the last digit in the predetermined number of digits, and so on.

According to a possible design, a decreased value range or an increased value range of the disturbance value in the mask image can be further limited to control a disturbance range. For example, when the disturbance value decreases towards neighborhood, a minimum disturbance value can be set, so that a disturbance value corresponding to a pixel farthest from the reference pixel in the mask image is not less than the minimum disturbance value. It can be understood that the minimum disturbance value can be any reasonable value less than the reference disturbance value, and can be specifically determined based on a service need. For example, when the disturbance value increases towards neighborhood, a maximum disturbance value can be set, so that a disturbance value corresponding to a pixel farthest from the reference pixel in the mask image is not greater than the maximum disturbance value. The maximum disturbance value can be any reasonable value greater than the reference disturbance value, and can be specifically determined based on a service need.

As such, the disturbance values can be separately determined for the pixels in the mask image or the elements in the array, and these disturbance values are in a one-to-one mapping relationship with the pixels in the first image. For ease of description, the mask image correspondingly has the disturbance values can be referred to as a noise image. It is worthwhile to note that, when the mask image represents an array (such as an auxiliary matrix), elements in the array are in arrangement consistent with pixel arrangement of the to-be-processed image. In the previous description, the pixels in the mask image can be equivalent to corresponding elements in the array, and the reference point can be an array element corresponding to the reference pixel. For example, the array element is referred to as a reference element.

Further, in step 204, the first disturbance image is obtained based on the result of merging the noise image with the first image channel of the to-be-processed image. Merging of the noise image with the first image channel of the to-be-processed image here can be understood as merging of corresponding element values, for example, merging of a disturbance value of a certain pixel in the noise image and a corresponding image value of the pixel on the first image channel of the to-be-processed image.

It can be understood that an image can be usually split into a plurality of image channels, and has a corresponding image value on each image channel. The image value can indicate a component of a corresponding pixel on a corresponding image channel, and display of the image depends on superposition of the components on the image channels.

In an embodiment, the image can be split into image channels R, G, and B, respectively corresponding to three colors: red, green, and blue. An image value on a single image channel corresponds to a corresponding color component, and usually has a value in 256 integer candidate values from 0 to 255. For example, an image value of a certain pixel on the R channel is 255, indicating that a component of the pixel on the red channel is 255. Assume that image values of the pixel on the G channel and the B channel both are 0, it indicates that components of the pixel on the green and blue channels both are 0, and the pixel is displayed as pure red after color components on the channels are merged.

In another embodiment, the image can be formed by using image channels H, S, and V in HSV color space. HSV (Hue, Saturation, Value) is color space created based on intuitive characteristic of a color, and is also referred to as a Hexcone model (Hexcone Model). Generally, each color is represented by three image channels: a hue (H for short), a saturation (S for short), and a value (V for short). The hue H can represent color information, that is, a location of a spectral color. For example, the parameter can be represented by an angle, and have a value ranging from 0° to 360°. If the parameter is calculated counterclockwise from red, red is 0°, green is 120°, and blue is 240°. Complementary colors of the colors are as follows: yellow is 60°, cyan is 180°, and purple is 300°. For example, the hue H can be represented by a value ranging from 0 to 1. The value 0 corresponds to the angle 0°, the value 0.5 can correspond to the angle 180°, and the value 1 can correspond to the angle 360°. In other words, values of pixels on the image channel H can range from 0° to 360°, or can be represented by values ranging from 0 to 1. The saturation S can represent color purity. Higher purity indicates a brighter color, and lower purity indicates a darker color. For example, an image value on the saturation image channel can range from 0.0 to 1.0. An image value on the image channel V usually ranges from 0.0 (black) to 1.0 (white).

In another embodiment, the image can be split into image channels Y, Cr, and Cb in YCrCb coding. YCbCr is usually used for continuous image processing in a movie or image processing in a digital photographing system. The image channel Y is a luma (luma) component, and the image channels Cb and Cr are concentration offset components of blue and red. Image values on the image channels Y, Cr, and Cb can be mutually converted on the channels R, G, and B. Value ranges of the image values on the image channels can vary with a conversion method. For example, in a conversion method, the value range of the image value on the Y image channel is from 16 to 235, and value ranges of the image values on the image channels Cr and Cb are from 16 to 240.

In another embodiment, the color channel of the image can be obtained in more possible splitting methods, and the splitting methods are not listed one by one here. It can be seen from the previous description that the image channels can have different value ranges, and correspondingly, corresponding disturbance value ranges can also be different.

On image channels whose image values having value ranges consistent with each other, the image value can be merged with an image value on any image channel by using the mask image including the disturbance value. For example, the R, G, and B channels all can be disturbed by using a mask image including a disturbance value ranging from 0 to 255, both of the channels Cr and Cb channels can be disturbed by using a mask image including a disturbance value ranging from 0 to 1, and so on.

It is worthwhile to note that, disturbance can be added to one image channel of the first image, or disturbance can be added to a plurality of image channels of the first image. Generally, in the RGB color space, disturbance can be added to at least one of the R, G, and B channels. In the HSV color space, disturbance can be added to at least one of the H and S image channels. In the YCrCb color space, disturbance can be added to at least one of the Cr and Cb image channels. The disturbance is added to different image channels. When value ranges of image values are the same, the same noise image can be used to merge with image values on the corresponding image channel, or different noise images can be used to merge with image values on the corresponding image channels. It can be understood that the disturbance on each image channel can be considered as an adjustment on brightness, light, etc. of the image. For example, disturbance on the image channel H can be equivalent to an addition of an analog light source and an impact of the analog light source on the light.

The following describes a process of merging the noise image with a single image channel. Assume that an image channel that disturbance is to be added is the first image channel, disturbance values of pixels in the noise image usually can be merged with image values on the first image channel in a one-to-one mapping relationship.

In one embodiment, the disturbance value and the image value can be directly added. For example, an image value corresponding to a certain pixel on the first image channel is 200, and a disturbance value is 20, the image value of the pixel on the first image channel can be 220 after merging.

However, in a process of generating the disturbance value, there are some possibilities that cannot be completely limited in advance. For example, a relatively small disturbance value corresponding to a certain pixel is 2. Assume that an image value of the pixel on the first image channel is 255, an image value corresponding to the pixel on the first image channel obtained after superposition is 257, which exceeds a normal image value range 0-255. This is clearly unreasonable. Therefore, optionally, after the disturbance value on the mask image is superimposed with the image value on the first image channel, it can be further determined whether a maximum value exceeds a reasonable range, for example, 0-255. If the maximum value exceeds the range, a disturbed image value corresponding to each pixel is normalized. For example, a normalized result is that the maximum value is normalized to 255. A normalized result corresponding to another pixel is positively related to a disturbed image value and negatively related to the maximum, and is normalized based on that a maximum normalized result is 255. For example, assume that the maximum value is marked as $a_{max}$, and the disturbed image value corresponding to a pixel n is marked as $a_n$. In this case, the normalized result can be $255 \times a_n/a_{max}$.

In another implementation, the corresponding disturbance value in the mask image can be subtracted from the image value of each pixel on the first image channel. In this case, a case that a reasonable value range is exceeded after subtracting can occur, for example, a difference is less than 0. In this case, optionally, an offset can be added to the image value corresponding to each pixel, so that a minimum image value obtained after the disturbance value is subtracted is 0. After the offset is added, if a maximum value exceeds a maximum value in the reasonable value range, normalization processing can be performed in a method similar to that described above. In another aspect, optionally, a difference (such as 275) between a maximum image value (such as 255) and a minimum image value (such as −20) that are obtained after the disturbance is performed can be used as a normalization factor, to replace $a_{max}$ in the previous description to perform normalization processing on each disturbed image values, so that each image value obtained after the disturbance value is subtracted is normalized between 0 and 255.

In another embodiment, weighted average can be performed on the image value on the first image channel and the disturbance value in the mask image based on a predetermined weight. For example, a weight of the disturbance value is 0.4, and a weight of the image value is 0.6. As such, in one aspect, it is ensured that a merged image value still fall within a reasonable value range. In another aspect, a component occupied by the disturbance value can be effectively controlled by using the weight, thereby avoiding a problem of image distortion caused by excessively large disturbance.

In more embodiments, the image value and the disturbance can be merged in more methods. Details are omitted here for simplicity. It is worthwhile to note that the previous description is made by using an example that the disturbance value is a positive value. However, in some possible designs, the disturbance value can be a negative value based on a service need. Implementations are not limited in the present specification.

According to a possible design, before the noise image is merged with the first image channel of the to-be-processed image, correction processing can be further performed on the noise image. The purpose of the correction processing is to set the disturbance value of each pixel to a value determined by disturbance values of all pixels in a certain neighborhood window of the pixel by using non-linear smoothing techniques. As such, the disturbance value corresponding to each pixel is made closer to a real value, and an isolated noise point is eliminated. For example, a correction processing method can be calculating an average value or a median value. A median value is used as an example. A disturbance value of a certain pixel can be replaced by a median value of disturbance values in a neighborhood of the pixel. This method is based on sorting statistics theory, and effectively suppresses a non-linear signal of noise. The neighborhood here can be a square matrix neighborhood, a circular neighborhood, a cross-shaped neighborhood, etc., and a square matrix neighborhood is used as an example: for example, a neighborhood formed by a 3×3 square matrix with a current pixel as a center. A disturbance value of a current pixel can be replaced by a median value (such as 35) of a maximum value (such as 50) and a minimum value (such as 20) of the disturbance values of the pixel in the neighborhood. When the median value of the maximum value and the minimum value is not a reasonable value, for example, the value on the image channel (such the image channel R, G, or B) can be only an integer but the median value is a decimal (such as 35.5), the median value can be rationalized in a predetermined method (for example, rounding down). As such, a noise image obtained after correction processing is closer to a light or parameter change in a real scenario.

To clarify the process of adding disturbance to the image, a specific example is described. In the specific example, first, a plurality of to-be-processed images can be grouped based on pixels, for example, the first group is 500×500 pixels, the second group is 960×960 pixels, the third group is 1980×1024 pixels, and so on. Then a mask image with the same pixel size is constructed for one of the groups. The first group is used as an example, and the mask image with the pixel size 500×500 can be constructed. A reference pixel is then determined in the mask image in a predetermined method, for example, a pixel in the 200th row and the 250th column is determined as the reference pixel. Next, a reference disturbance value M can be determined for the reference pixel, and the reference disturbance value can be randomly generated. Assume that the mask image corresponds to the image channels R, G, and B, M can be a value in a predetermined range, such as a value ranging from 0 to 255, from 0 to 150, or from 100 to 255. Then the disturbance value decreases or increases towards surrounding pixels based on the reference disturbance value with the reference pixel as a center. When the disturbance value decreases, a minimum decreased value $m_1$ less than M can further be set, and $m_1$ ranges from 0 to M, from 0 to M/2, and so on. In this case, the disturbance value ranges from $m_1$ to M. When the disturbance value increases, a minimum increased value $m_2$ greater than M can further be set, and $m_2$ ranges from M to 255, from 2M/3 to 255, and so on. In this case, the disturbance value ranges from M to $m_2$. The disturbance values are calculated based on a specific service need to form a disturbance image. The disturbance values can further meet the predetermined distribution, such as linear distribution or normal distribution based on a distance from the reference pixel. It can be understood that one or more disturbance images can be generated for the first group of images.

Then, the mask image can be merged with each image in the first group of images. As shown in FIG. 3, assume that a merging process is weighted average, a weight of a corresponding image channel is a, and 0<a<1, such as 0.7. In this case, a weight corresponding to the mask image is 1−a. A merging result of a single pixel on a specified image channel and on a randomly determined image channel is a× image value+(1−a)×disturbance value=disturbed image value. A disturbance image can be displayed after a disturbed image channel is merged with an image value on another image channel based on a component indicated by a disturbed image value.

In a disturbance process of a single image, one image or more image channels can be disturbed. In a process of performing disturbance on a plurality of image channels, the same disturbance image can be used, or different disturbance images can be separately used. Implementations are not limited in the present specification.

A specific process of performing disturbance processing on an image is described by using the previous specific example. Disturbance on the image is equivalent to adjustment of a device parameter used for image collection or a change to an external factor such as light.

Figure 4:
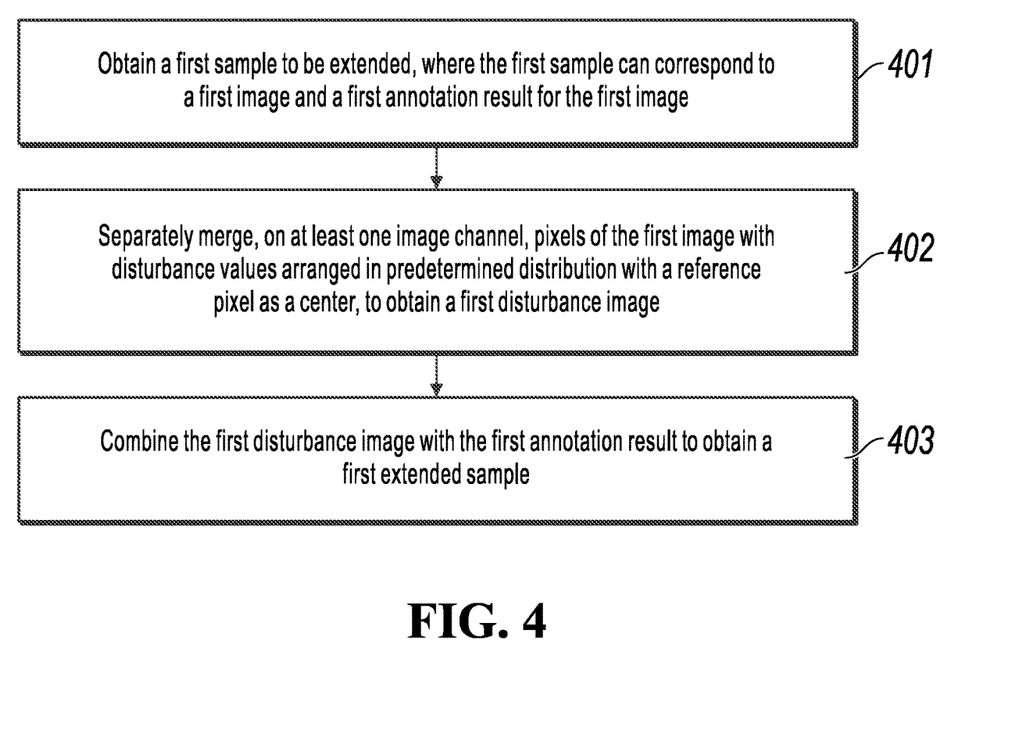
FIG. 4 is a flowchart illustrating a sample extension method, according to an embodiment.

A specific application scenario of the image processing process can be a sample extension process of an image recognition model. It is worthwhile to note that the sample extension process of the image recognition model can be executed by any device, computer, or server that has a computing capability, and the execution body can be consistent with or inconsistent with the execution body of the process in FIG. 2. As shown in FIG. 4, the sample extension process can include the following steps.

In step 401, a first sample to be extended is obtained. The first sample can correspond to a first image and a first annotation result for the first image. For example, the first sample is a sample that can be used to train the image recognition model. The first sample can be randomly obtained from a sample set, or can be obtained in a specified sequence. In addition, the first sample can be a separate sample obtained from the sample set, or can be any one of a group of images with certain pixel distribution (such as 500×500) in all obtained samples.

Then in step 402, pixels of the first image are separately merged on at least one image channel with disturbance values arranged in predetermined distribution with a reference pixel as a center, to obtain a first disturbance image. The predetermined distribution can be used to describe a relationship between a disturbance value corresponding to each pixel and a distance between the pixel value and the reference pixel, for example, linear distribution or normal distribution using a distance from the reference pixel as an independent variable.

According to an implementation, a method of determining the first disturbance image is as follows.

A mask image with pixel arrangement the same as the first image is constructed. There can be one or more mask images. A quantity of rows and columns of pixels in the mask image is consistent with those of the first image.

A reference point corresponding to a predetermined reference disturbance value based on a predetermined rule is determined in the mask image. The reference point is a pixel corresponding to the reference pixel. Based on different service scenarios, the predetermined reference value can be a maximum disturbance value or a minimum disturbance value. The predetermined reference value can be determined in advance, or can be determined in step 402. The reference point can also be understood as a reference point, etc. The reference point can be understood as a disturbance light source, an obstacle, etc. that is added to an image. The reference point can be a pixel in the mask image. The predetermined rule is a rule for determining a reference point, for example, randomly determining or negotiating, determining together with a mask image based on a specific determining rule and the like.

Disturbance values sequentially decrease or sequentially increase from the reference disturbance value towards surrounding pixels are generated in the mask image based on predetermined distribution with the reference pixel as a center, to obtain a noise image. A process of generating each disturbance value is similar to the process described in step 203. Details are omitted here for simplicity. The first noise image can be understood as a mask image of disturbance values corresponding to given pixels. A maximum value or minimum value can further be set in the disturbance values, and corresponds to a pixel with a largest distance from the reference pixel. Optionally, the maximum or minimum value mentioned here is opposite to the reference disturbance value. For example, if the reference disturbance value is a maximum disturbance value, it can be set that the pixel with a largest distance from the reference pixel has a minimum value in the disturbance values, or vice versa. For ease of description, a mask image of a currently determined disturbance value is referred to as the first noise image. In some embodiments, correction processing can be further performed on each disturbance value obtained through calculation, and a mask image that correspondingly has a corrected disturbance value is referred to as the first noise image. A specific method for performing correction processing is the process of performing correction processing on the disturbance image. Details are omitted here for simplicity.

A first disturbance image for the first image is formed based on a result of merging the first noise image with a first image channel of the first image. Here, the result of merging the first noise image with the first image channel of the first image can be understood as a result of merging disturbance values in the first noise image with image values on the first image channel in a one-to-one pixel mapping relationship. The merging method can be summing, subtracting, weighted average, etc. Details are omitted here for simplicity.

According to another implementation, an array with arrangement consistent with pixel arrangement of the first image can be further constructed to replace the mask image in the previous implementation. A quantity of elements, a quantity of rows, and a quantity of columns in the array are respectively consistent with a quantity of pixels, a quantity of rows, and a quantity of columns in the first image, and a reference pixel corresponds to a reference element, or a reference element and a reference pixel are collectively referred to as a reference point. Other processing processes are similar to that in the previous implementation.

It is worthwhile to note that a process of performing disturbance processing in the first image to obtain the first disturbance image can correspond to the process shown in FIG. 2. In some implementations, related descriptions in FIG. 2 are applicable to current partial processing.

Further, in step 403, the first disturbance image is combined with the first annotation result to obtain a first extended sample. The first annotation result can be used as an annotation result of the first disturbance image to form the first extended sample. The first sample can alternatively have a plurality of extended samples determined based on a similar method. In other words, the annotation result of the original sample is reserved in the extended sample. As such, regardless of what interference is added to the original sample, it is ensured that the annotation result remains unchanged.

Figure 5:
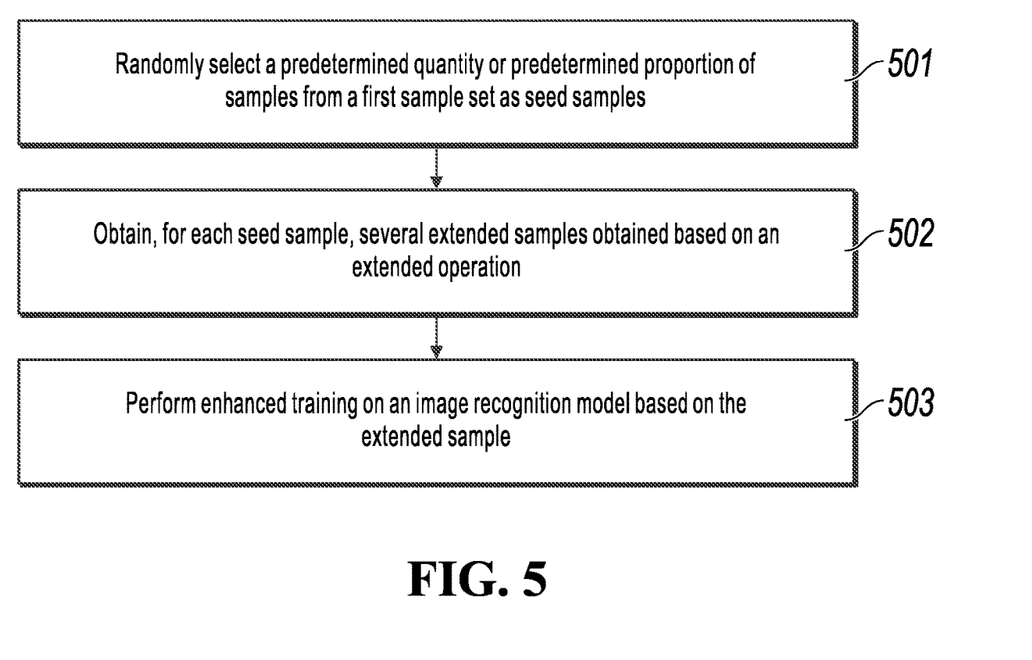
FIG. 5 is a flowchart illustrating an enhanced training method for an image recognition model, according to an embodiment.

Generally, the annotation result is a guide to an output result of the image recognition model. Furthermore, the extended sample can be used in the model enhancement training process to increase robustness of the model. FIG. 5 shows a process of performing enhanced training for an image recognition model, according to an embodiment. The process can be executed by any computer, device, or server that has a computing capability. The execution body can be consistent with or inconsistent with the execution body of at least one of the processes in FIG. 2 and FIG. 4.

As shown in FIG. 5, the process of performing enhanced training on an image recognition model includes the following steps.

First, in step 501, a predetermined quantity or predetermined proportion of samples are randomly selected from a first sample set as seed samples. The first sample set can be an original training sample set. Since the selected sample is used as a basis for generating an extended sample, one or more extended samples can be obtained through extension based on one sample. Therefore, the selected sample is referred to here as the seed sample.

Each seed sample corresponds to a seed image and an annotation result for the corresponding seed image. The predetermined quantity or predetermined proportion of samples are selected as the seed sample, instead of using all samples in the first sample set as the seed samples. In one aspect, an excessive calculation amount can be avoided; and in another aspect, a proportion of the extended sample can be controlled to prevent too many extended samples from adversely affecting performance of the image recognition model.

Next, by using step 502, several extended samples obtained based on an extended operation are separately obtained for each seed sample. The extension operation for a single seed sample includes: separately merging, on at least one image channel, pixels of a single seed image corresponding to the single seed sample with disturbance values arranged in predetermined distribution with a reference pixel as a center, to obtain a single disturbance image, where the predetermined distribution is related to a distance from each pixel to the reference pixel; and constructing a single extended sample based on the single disturbance image and the annotation result corresponding to the single seed sample, where the reference pixel is determined based on a predetermined rule. The extension operation can correspond to the process shown in FIG. 4. Details are omitted here for simplicity.

In an implementation, the extension operation can be performed by using step 502 to generate several extended samples for each seed sample.

In another embodiment, a part of the sample extension operation can be further completed in advance, and the other part of the operation is performed in the present step 502. For example, a plurality of disturbance images can be generated in advance in a pixel arrangement method (a quantity of rows, a quantity of columns, etc.) for a sample in the first sample set. In the present step 502, some or all of the plurality of disturbance images can be selected for the seed samples selected in step 501, and the disturbance images are merged with the seed images to obtain a corresponding extended image.

In another implementation, several corresponding extended samples can be generated in advance for each sample in the first sample set. In the present step 502, some or all extended samples corresponding to the seed samples selected in step 501 can be obtained based on the seed samples.

In conclusion, several extended samples determined based on the extended operation can be obtained for a single seed sample in step 501.

Further, enhanced training is performed on the image recognition model based on the extended sample by using step 503. According to an implementation of one aspect, each extended sample can be added to the first sample set, such as a training sample set, and the image recognition model is trained by using the first sample set. According to an implementation of another aspect, each extended sample can be added to a second sample set, and performing, by using the second sample set, enhanced training on an image recognition model obtained through training by using the first sample set.

It is worthwhile to note that the extended sample used in the process shown in FIG. 5 can be an extended sample determined by using the process shown in FIG. 4. In addition, when the sample extension operation is completed by using step 502, the previous description of the sample extension process in FIG. 4 is also applicable to a related part in step 502. Details are omitted here for simplicity.

It can be understood that, based on an image recognition function trained by using an original sample set, the image recognition model is further trained by using the extended sample that disturbance is added. Because the annotation result of the original sample is reserved in the extended sample, the trained image recognition model has a better recognition function for an image that disturbance is added, thereby improving robustness of the image recognition model. A face recognition payment authentication service scenario is used as an example. When target recognition and detection on an image of a living feature are required, face recognition payment authentication is performed after interference is added to a face image of another person, and an image recognition model not trained by using the extended sample could possibly pass a detection of a living feature due to a lack of an interference sample, to complete payment. However, the image recognition model trained by using the extended sample is trained by using the disturbance. As such, the image recognition model still recognizes an image including an image of a living feature as an image of a living feature after disturbance is added, and still recognizes a non-living collected image as an image of a non-living feature after disturbance is added. Therefore, the image recognition model can have better recognition performance.

Figure 6:
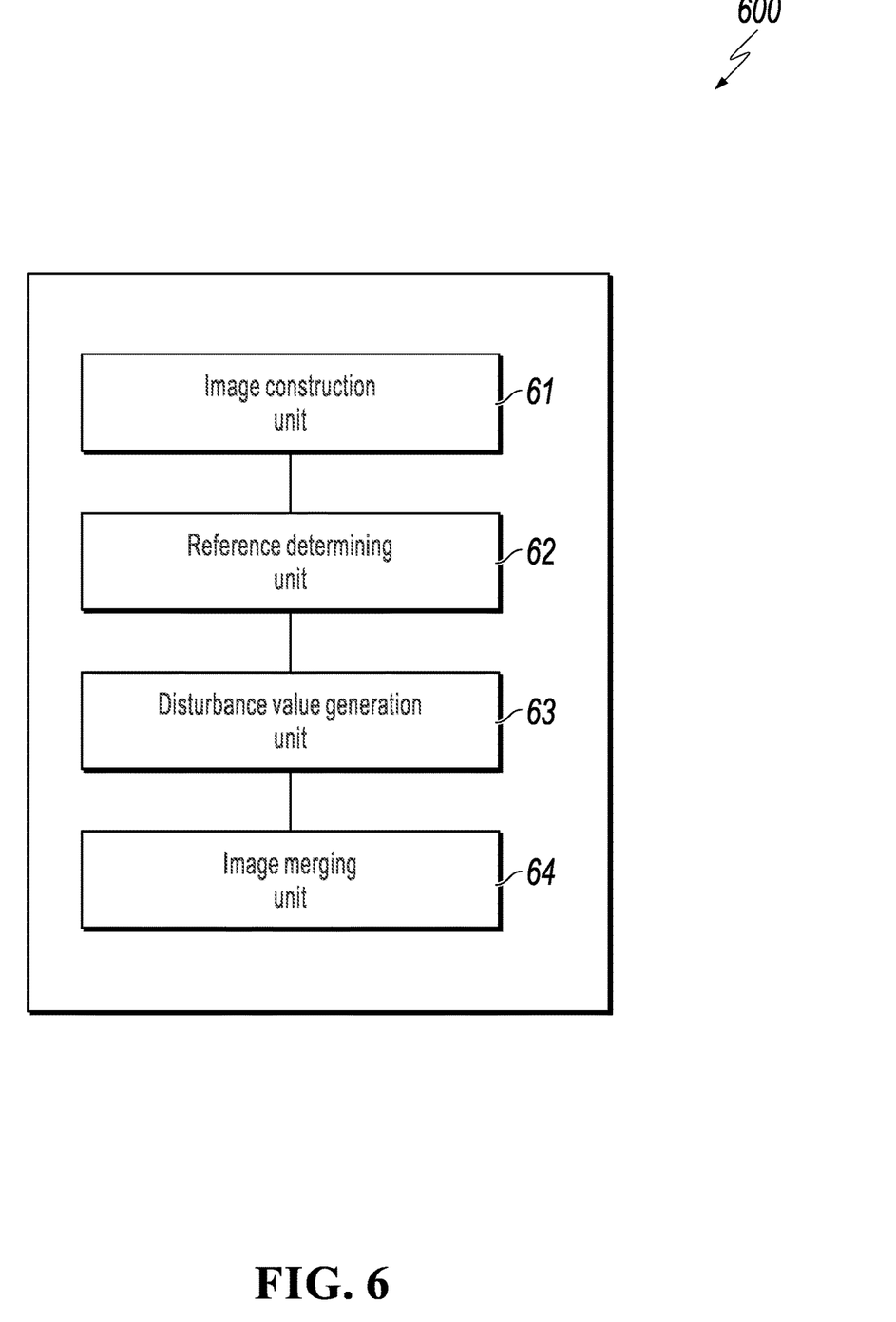
FIG. 6 is a schematic block diagram illustrating an image processing apparatus, according to an embodiment.

According to another implementation, as shown in FIG. 6, an image processing apparatus 600 is further provided, including: an image construction unit 61, configured to construct a mask image with pixel arrangement the same as a to-be-processed image; a reference determining unit 62, configured to determine, in the mask image, a reference pixel corresponding to a predetermined reference disturbance value based on a predetermined rule; a disturbance value generation unit 63, configured to generate, in the mask image, disturbance values sequentially decrease or sequentially increase from the reference disturbance value towards surrounding pixels based on predetermined distribution with the reference pixel as a center, to obtain a noise image; and an image merging unit 64, configured to form a disturbance image for the to-be-processed image based on a result of merging the noise image with a first image channel of the to-be-processed image.

Figure 7:
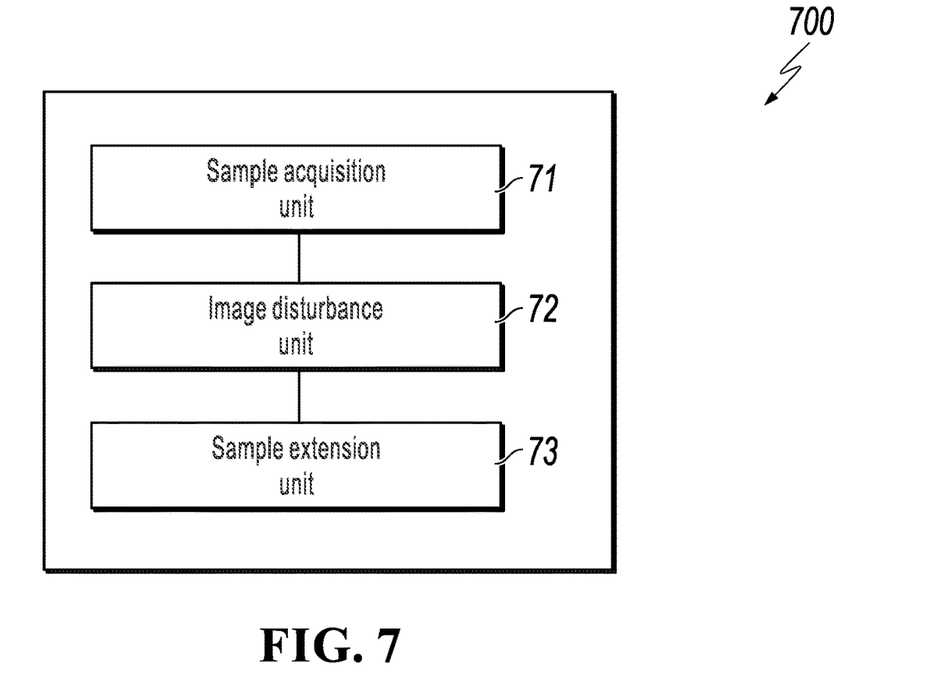
FIG. 7 is a schematic block diagram illustrating a sample extension apparatus, according to an embodiment.

According to still another implementation, as shown in FIG. 7, an image sample extension apparatus 700 is further provided, including: a sample acquisition unit 71, configured to obtain a first sample to be extended, where the first sample corresponds to a first image and a first annotation result for the first image; an image disturbance unit 72, configured to separately merge, on at least one image channel, pixels of the first image with disturbance values arranged in predetermined distribution with a reference pixel as a center, to obtain a first disturbance image, where the predetermined distribution is related to a distance from each pixel to the reference pixel; and an image extension unit 73, configured to combine the first disturbance image with the first annotation result to obtain a first extended sample.

Figure 8:
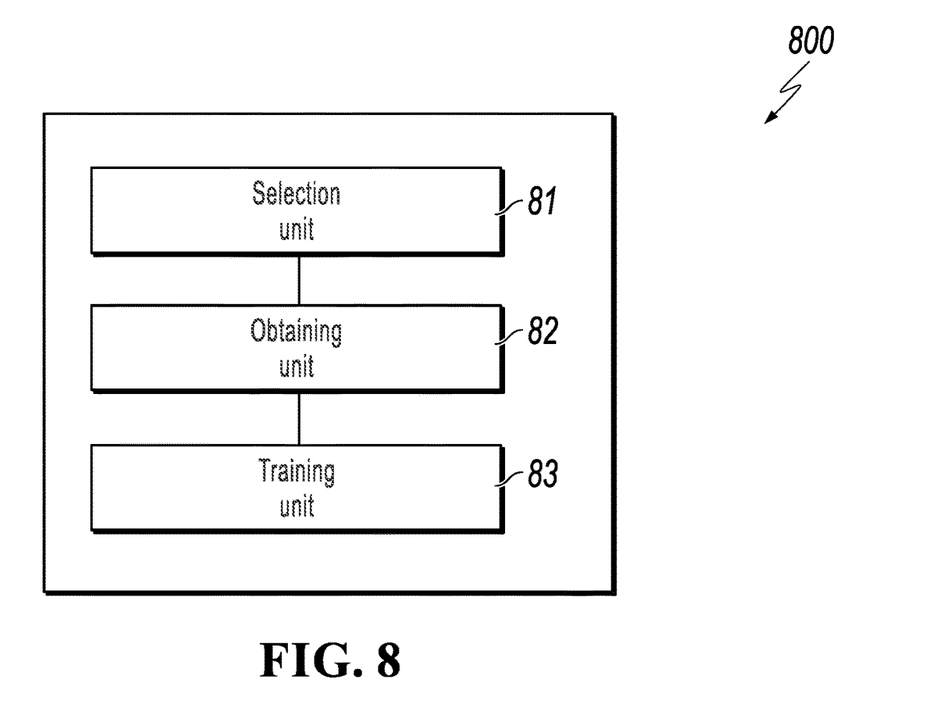
FIG. 8 is a schematic block diagram illustrating an enhanced training apparatus for an image recognition model, according to an embodiment.

According to another implementation, as shown in FIG. 8, an enhanced training apparatus 800 for an image recognition model is further provided. The apparatus 800 includes: a selection unit 81, configured to randomly select a predetermined quantity or predetermined proportion of samples from a first sample set as seed samples, where each seed sample corresponds to each seed image and an annotation result for the corresponding seed image; an obtaining unit 82, configured to obtain, for each seed sample, several extended samples obtained based on an extension operation, where the extension operation for a single seed sample includes: separately merging, on at least one image channel, pixels of a single seed image corresponding to the single seed sample with disturbance values arranged in predetermined distribution with a reference pixel as a center, to obtain a single disturbance image, where the predetermined distribution is related to a distance from each pixel to the reference pixel; and constructing a single extended sample based on the single disturbance image and the annotation result corresponding to the single seed sample, where the reference pixel is determined based on a predetermined rule; and a training unit 83, configured to perform enhanced training in the image recognition model based on the extended sample.

It is worthwhile to note that the apparatuses 600, 700, and 800 shown in FIG. 6, FIG. 7, and FIG. 8 are respectively apparatus embodiments corresponding to the method implementations shown in FIG. 2, FIG. 3, and FIG. 4. Corresponding descriptions in the method embodiments shown in FIG. 22, FIG. 3, and FIG. 4 are also applicable to the apparatuses 600, 700, and 800. Details are omitted here for simplicity.

According to another embodiment, a computer readable storage medium is provided, and the computer readable storage medium stores a computer program. When the computer program is executed in a computer, the computer is enabled to execute the methods described with reference to FIG. 2, FIG. 4, or FIG. 5.

According to still another embodiment, a computing device is provided, including a memory and a processor. The memory stores executable code, and when executing the executable code, the processor implements the methods described with reference to FIG. 2, FIG. 4, or FIG. 5.

A person skilled in the art should be aware that in the previous one or more examples, functions described in the embodiments of the present specification can be implemented by hardware, software, firmware, or any combination thereof. When the present disclosure is implemented by software, the functions can be stored in a computer readable medium or transmitted as one or more instructions or code in the computer readable medium.

In the described specific implementations, the objective, technical solutions, and benefits of the technical concept of the present specification are further described in detail. It should be understood that the descriptions are merely specific implementations of the technical concept of the present specification, but are not intended to limit the protection scope of the technical concept of the present specification. Any modification, equivalent replacement, or improvement made based on the technical solutions in the implementations of the present specification should fall within the protection scope of the technical concept of the present specification.

What is claimed is:

1. A computer-implemented method, comprising:
    randomly selecting a predetermined quantity of samples from a first sample set as seed samples, wherein a seed sample of the seed samples corresponds to a seed image and an annotation result for the seed image;
    obtaining, for each of the seed samples, at least one extended sample based on an extension operation for the seed sample, wherein the extension operation comprises:
        constructing a mask image with a pixel arrangement the same as the seed image;
        determining a reference pixel in the mask image based on a predetermined reference disturbance value, wherein the reference pixel comprises an interference source;
        generating, in the mask image with the reference pixel as a center, disturbance values sequentially decrease or increase by distance from the predetermined reference disturbance value of the reference pixel towards surrounding pixels based on a predetermined distribution, wherein the predetermined distribution is related to a distance from each of the pixels to the reference pixel;
        separately merging, on at least one image channel, pixels of the seed image of the seed sample with the disturbance values to obtain a disturbance image; and
        constructing an extended sample based on the disturbance image and the annotation result for the seed image, wherein the reference pixel is determined based on a predetermined rule; and
    performing an enhanced training in an image recognition model using the at least one extended sample as input.

2. The computer-implemented method of claim 1, wherein separately merging, on the at least one image channel, the pixels of the seed image of the seed sample with the disturbance values to obtain the disturbance image comprises:
    determining, in the mask image, a reference point corresponding to the predetermined reference disturbance value and the reference pixel based on the predetermined rule;
    generating second disturbance values in the mask image to obtain a first noise image, wherein the second disturbance values sequentially decrease or increase from the predetermined reference disturbance value towards the surrounding pixels based on the predetermined distribution with the reference point as the center; and
    obtaining a first disturbance image based on a result of merging the first noise image with a first image channel of the seed image.

3. The computer-implemented method of claim 2, further comprising:
    superposing the first noise image onto the first image channel of the seed image;
    determining a weighted average on third disturbance values in the first noise image and image values on the first image channel using a one-to-one pixel mapping relationship; and
    obtaining a superposition result of the first image channel of the seed image.

4. The computer-implemented method of claim 2, wherein the first disturbance image comprises a result of superposing the first noise image onto a second image channel of the seed image, or a result of superposing a second noise image onto the second image channel of the seed image.

5. The computer-implemented method of claim 1, wherein the seed image comprises a first pixel, and wherein a distance between the first pixel and the reference pixel is a Euclidean distance between the first pixel and the reference pixel by using rows and columns that the first pixel and the reference pixel are located as coordinates.

6. The computer-implemented method of claim 1, wherein separately merging, on the at least one image channel, the pixels of the seed image of the seed sample with the disturbance values to obtain the disturbance image comprises:
    constructing an auxiliary matrix with a pixel arrangement the same as the seed image;
    determining, based on the predetermined rule, a reference element that is in the auxiliary matrix and corresponds to the predetermined reference disturbance value, wherein the reference element is a matrix element corresponding to the reference pixel;
    generating fourth disturbance values in the auxiliary matrix to obtain a first noise matrix, wherein the fourth disturbance values sequentially decrease or increase from the predetermined reference disturbance value towards surrounding elements based on the predetermined distribution with the reference element as the center; and
    obtaining a first disturbance image based on a result of superposing the first noise matrix onto a first image channel of the seed image.

7. The computer-implemented method of claim 1, wherein performing the enhanced training in the image recognition model using the at least one extended sample as input comprises:
    adding the at least one extended sample to the first sample set, and training the image recognition model by using the first sample set; or
    adding the at least one extended sample to a second sample set, and performing the enhanced training in the image recognition model by using the second sample set, wherein the image recognition model is obtained through a training using the first sample set.

8. A non-transitory, computer-readable medium storing one or more instructions executable by a computer system to perform operations comprising:
   randomly selecting a predetermined quantity of samples from a first sample set as seed samples, wherein a seed sample of the seed samples corresponds to a seed image and an annotation result for the seed image;
   obtaining, for each of the seed samples, at least one extended sample based on an extension operation for the seed sample, wherein the extension operation comprises:
      constructing a mask image with a pixel arrangement the same as the seed image;
      determining a reference pixel in the mask image based on a predetermined reference disturbance value, wherein the reference pixel comprises an interference source;
      generating, in the mask image with the reference pixel as a center, disturbance values sequentially decrease or increase by distance from the predetermined reference disturbance value of the reference pixel towards surrounding pixels based on a predetermined distribution, wherein the predetermined distribution is related to a distance from each of the pixels to the reference pixel;
      separately merging, on at least one image channel, pixels of the seed image of the seed sample with the disturbance values to obtain a disturbance image; and
      constructing an extended sample based on the disturbance image and the annotation result for the seed image, wherein the reference pixel is determined based on a predetermined rule; and
   performing an enhanced training in an image recognition model using the at least one extended sample as input.

9. The non-transitory, computer-readable medium of claim 8, wherein separately merging, on the at least one image channel, the pixels of the seed image of the seed sample with the disturbance values to obtain the disturbance image comprises:
   determining, in the mask image, a reference point corresponding to the predetermined reference disturbance value and the reference pixel based on the predetermined rule;
   generating second disturbance values in the mask image to obtain a first noise image, wherein the second disturbance values sequentially decrease or increase from the predetermined reference disturbance value towards the surrounding pixels based on the predetermined distribution with the reference point as the center; and
   obtaining a first disturbance image based on a result of merging the first noise image with a first image channel of the seed image.

10. The non-transitory, computer-readable medium of claim 9, wherein the operations further comprise:
   superposing the first noise image onto the first image channel of the seed image;
   determining a weighted average on third disturbance values in the first noise image and image values on the first image channel using a one-to-one pixel mapping relationship; and
   obtaining a superposition result of the first image channel of the seed image.

11. The non-transitory, computer-readable medium of claim 9, wherein the first disturbance image comprises a result of superposing the first noise image onto a second image channel of the seed image, or a result of superposing a second noise image onto the second image channel of the seed image.

12. The non-transitory, computer-readable medium of claim 8, wherein the seed image comprises a first pixel, and wherein a distance between the first pixel and the reference pixel is a Euclidean distance between the first pixel and the reference pixel by using rows and columns that the first pixel and the reference pixel are located as coordinates.

13. The non-transitory, computer-readable medium of claim 8, wherein separately merging, on the at least one image channel, the pixels of the seed image of the seed sample with the disturbance values to obtain the disturbance image comprises:
   constructing an auxiliary matrix with a pixel arrangement the same as the seed image;
   determining, based on the predetermined rule, a reference element that is in the auxiliary matrix and corresponds to the predetermined reference disturbance value, wherein the reference element is a matrix element corresponding to the reference pixel;
   generating fourth disturbance values in the auxiliary matrix to obtain a first noise matrix, wherein the fourth disturbance values sequentially decrease or increase from the predetermined reference disturbance value towards surrounding elements based on the predetermined distribution with the reference element as the center; and
   obtaining a first disturbance image based on a result of superposing the first noise matrix onto a first image channel of the seed image.

14. The non-transitory, computer-readable medium of claim 8, wherein performing the enhanced training in the image recognition model using the at least one extended sample as input comprises:
   adding the at least one extended sample to the first sample set, and training the image recognition model by using the first sample set; or
   adding the at least one extended sample to a second sample set, and performing the enhanced training in the image recognition model by using the second sample set, wherein the image recognition model is obtained through a training using the first sample set.

15. A computer-implemented system, comprising:
   one or more computers; and
   one or more computer memory devices interoperably coupled with the one or more computers and having tangible, non-transitory, machine-readable media storing one or more instructions that, when executed by the one or more computers, perform operations comprising:
      randomly selecting a predetermined quantity of samples from a first sample set as seed samples, wherein a seed sample of the seed samples corresponds to a seed image and an annotation result for the seed image;
      obtaining, for each of the seed samples, at least one extended sample based on an extension operation for the seed sample, wherein the extension operation comprises:
         constructing a mask image with a pixel arrangement the same as the seed image;

determining a reference pixel in the mask image based on a predetermined reference disturbance value, wherein the reference pixel comprises an interference source;

generating, in the mask image with the reference pixel as a center, disturbance values sequentially decrease or increase by distance from the predetermined reference disturbance value of the reference pixel towards surrounding pixels based on a predetermined distribution, wherein the predetermined distribution is related to a distance from each of the pixels to the reference pixel;

separately merging, on at least one image channel, pixels of the seed image of the seed sample with the disturbance values to obtain a disturbance image; and constructing an extended sample based on the disturbance image and the annotation result for the seed image, wherein the reference pixel is determined based on a predetermined rule; and performing an enhanced training in an image recognition model using the at least one extended sample as input.

16. The computer-implemented system of claim 15, wherein separately merging, on the at least one image channel, the pixels of the seed image of the seed sample with the disturbance values to obtain the disturbance image comprises:

determining, in the mask image, a reference point corresponding to the predetermined reference disturbance value and the reference pixel based on the predetermined rule;

generating second disturbance values in the mask image to obtain a first noise image, wherein the second disturbance values sequentially decrease or increase from the predetermined reference disturbance value towards the surrounding pixels based on the predetermined distribution with the reference point as the center; and obtaining a first disturbance image based on a result of merging the first noise image with a first image channel of the seed image.

17. The computer-implemented system of claim 16, wherein the operations further comprise:

superposing the first noise image onto the first image channel of the seed image;

determining a weighted average on third disturbance values in the first noise image and image values on the first image channel using a one-to-one pixel mapping relationship; and obtaining a superposition result of the first image channel of the seed image.

18. The computer-implemented system of claim 16, wherein the first disturbance image comprises a result of superposing the first noise image onto a second image channel of the seed image, or a result of superposing a second noise image onto the second image channel of the seed image.

19. The computer-implemented system of claim 15, wherein the seed image comprises a first pixel, and wherein a distance between the first pixel and the reference pixel is a Euclidean distance between the first pixel and the reference pixel by using rows and columns that the first pixel and the reference pixel are located as coordinates.

20. The computer-implemented system of claim 15, wherein separately merging, on the at least one image channel, the pixels of the seed image of the seed sample with the disturbance values to obtain the disturbance image comprises:

constructing an auxiliary matrix with a pixel arrangement the same as the seed image;

determining, based on the predetermined rule, a reference element that is in the auxiliary matrix and corresponds to the predetermined reference disturbance value, wherein the reference element is a matrix element corresponding to the reference pixel;

generating fourth disturbance values in the auxiliary matrix to obtain a first noise matrix, wherein the fourth disturbance values sequentially decrease or increase from the predetermined reference disturbance value towards surrounding elements based on the predetermined distribution with the reference element as the center; and obtaining a first disturbance image based on a result of superposing the first noise matrix onto a first image channel of the seed image.

* * * * *